(12) United States Patent
Zhu

(10) Patent No.: US 9,710,572 B2
(45) Date of Patent: Jul. 18, 2017

(54) COMPLETING APPLICATION INTERFACES

(71) Applicant: Alibaba Group Holding Limited, George Town (KY)

(72) Inventor: Zhiyu Zhu, Hangzhou (CN)

(73) Assignee: Alibaba Group Holding Limited (KY)

( * ) Notice: Subject to any disclaimer, the term of this patent is extended or adjusted under 35 U.S.C. 154(b) by 284 days.

(21) Appl. No.: 13/899,219

(22) Filed: May 21, 2013

(65) Prior Publication Data
US 2013/0318118 A1 Nov. 28, 2013

(30) Foreign Application Priority Data

May 24, 2012 (CN) .......................... 2012 1 0165072

(51) Int. Cl.
G06F 7/00 (2006.01)
G06F 17/30 (2006.01)
G06F 17/24 (2006.01)

(52) U.S. Cl.
CPC ...... *G06F 17/30979* (2013.01); *G06F 17/243* (2013.01); *G06F 17/30637* (2013.01); *G06F 17/30864* (2013.01); *G06F 17/30893* (2013.01); *G06F 17/30967* (2013.01)

(58) Field of Classification Search
None
See application file for complete search history.

(56) References Cited

U.S. PATENT DOCUMENTS

| 6,738,766 | B2 | 5/2004 | Peng |
| 7,272,601 | B1 * | 9/2007 | Wang ............... G06F 17/30637 707/748 |
| 7,444,343 | B2 | 10/2008 | Wang et al. |
| 7,814,083 | B2 * | 10/2010 | Kwon et al. ................. 707/705 |
| 7,966,323 | B2 * | 6/2011 | Bocking ........... G06F 17/30994 707/731 |
| 8,065,286 | B2 * | 11/2011 | Jones ........................... 707/706 |

(Continued)

FOREIGN PATENT DOCUMENTS

| CN | 101216853 | 7/2008 |
| CN | 102122286 | 7/2011 |

(Continued)

OTHER PUBLICATIONS

Eric Chu et al: "Combining keyword search and forms for ad hoc querying of databases", Proceedings of the 35th SIGMOD International Conference on Management of Data, SIGMOD '09, Jun. 29, 2009 (Jun. 29, 2009),-Jul. 2, 2009 (Jul. 2, 2009), pp. 349-360, XP055071964, New York, New York, USA DOI: 10.1145/1559845. 1559883 ISBN: 978-1-60-558551-2 the whole document.

*Primary Examiner* — Hexing Liu

(74) *Attorney, Agent, or Firm* — Van Pelt, Yi & James LLP

(57) ABSTRACT

Completing an application interface is disclosed, including: segmenting a search query into one or more keywords; determining an application interface based at least in part on the one or more keyword units; determining an attribute for an input field associated with the determined application interface; determining a value corresponding to the attribute based at least in part on the one or more keyword units; and presenting the determined application interface, wherein the determined application interface includes the input field prepopulated with the value.

16 Claims, 11 Drawing Sheets

(56) References Cited

U.S. PATENT DOCUMENTS

| | | |
|---|---|---|
| 8,370,342 B1 | 2/2013 | Li et al. |
| 8,484,187 B1 | 7/2013 | Hong et al. |
| 8,548,973 B1* | 10/2013 | Kritt ................. G06F 17/30867 707/706 |
| 8,788,944 B1* | 7/2014 | Gill ........................... G06F 8/61 715/744 |
| 9,021,020 B1* | 4/2015 | Ramaswamy ......... G06Q 30/06 709/203 |
| 2001/0047363 A1* | 11/2001 | Peng .......................... 707/104.1 |
| 2004/0059776 A1* | 3/2004 | Pitzel ............... G06F 17/30595 709/203 |
| 2006/0230033 A1 | 10/2006 | Halevy et al. |
| 2007/0055745 A1 | 3/2007 | Moricz |
| 2007/0130134 A1 | 6/2007 | Ramsey et al. |
| 2008/0228806 A1* | 9/2008 | Davies et al. ................ 707/102 |
| 2008/0228837 A1* | 9/2008 | Davies et al. ................ 707/202 |
| 2008/0228903 A1* | 9/2008 | Davies et al. ................ 709/221 |
| 2008/0229251 A1* | 9/2008 | Davies et al. ................ 715/854 |
| 2009/0089282 A1 | 4/2009 | Qi et al. |
| 2009/0216790 A1* | 8/2009 | Dexter ......................... 707/102 |
| 2009/0271350 A1 | 10/2009 | Feng et al. |
| 2010/0070448 A1* | 3/2010 | Omoigui ........................ 706/47 |
| 2010/0175020 A1* | 7/2010 | Kim et al. .................... 715/783 |
| 2010/0306191 A1* | 12/2010 | LeBeau et al. .............. 707/723 |
| 2011/0072046 A1* | 3/2011 | Chi .................. G06F 17/30693 707/773 |
| 2011/0106779 A1 | 5/2011 | George et al. |
| 2011/0161883 A1* | 6/2011 | Kennedy et al. ............. 715/835 |
| 2011/0208722 A1* | 8/2011 | Hannuksela ........ G06F 17/3002 707/723 |
| 2011/0252053 A1* | 10/2011 | Takehara .......... G06F 17/30864 707/769 |
| 2011/0307354 A1* | 12/2011 | Erman ...................... G06F 8/60 705/27.1 |
| 2011/0307484 A1* | 12/2011 | Anand .......................... 707/736 |
| 2012/0084321 A1* | 4/2012 | Dexter ............. G06F 17/30011 707/772 |
| 2012/0089457 A1* | 4/2012 | Seth .................. G06F 17/30867 705/14.49 |
| 2012/0095862 A1* | 4/2012 | Schiff .................... G06Q 30/06 705/26.7 |
| 2012/0309464 A1* | 12/2012 | Lim .................. H04M 1/72522 455/566 |
| 2013/0024371 A1* | 1/2013 | Hariramani .......... G06Q 20/351 705/41 |
| 2013/0036108 A1* | 2/2013 | Corbeau ............. G06F 17/3089 707/722 |
| 2013/0218923 A1* | 8/2013 | Kaul ................. G06F 17/30864 707/769 |
| 2013/0262507 A1* | 10/2013 | Koppaka ........... G06F 17/30477 707/769 |
| 2014/0214898 A1* | 7/2014 | Shapira ............. G06F 17/30864 707/771 |
| 2015/0161208 A1* | 6/2015 | Yoshioka .......... G06F 17/30424 707/771 |
| 2015/0242470 A1* | 8/2015 | Ben-Itzhak ........... G06Q 30/02 707/722 |
| 2016/0299977 A1* | 10/2016 | Hreha ............... G06F 17/30867 |

FOREIGN PATENT DOCUMENTS

| | | |
|---|---|---|
| JP | 2000155633 A | 6/2000 |
| JP | 2001282841 A | 10/2001 |
| JP | 2003132060 A | 5/2003 |
| JP | 2004287589 A | 10/2004 |
| JP | 20053095666 A | 4/2005 |
| JP | 2006155275 | 6/2006 |
| JP | 2012079160 A | 4/2012 |

* cited by examiner

Search 1381234567899

Mobile Phone Number to Be Recharged

Carrier

Recharge Amount

Recharge

FIG. 7

COMPLETING APPLICATION INTERFACES

CROSS REFERENCE TO OTHER APPLICATIONS

This application claims priority to People's Republic of China Patent Application No. 201210165072.2 entitled AN APPLICATION INTERFACE PROVIDING METHOD AND DEVICE, filed May 24, 2012 which is incorporated herein by reference for all purposes.

FIELD OF THE INVENTION

The present application relates to the field of information processing technology. In particular, it relates to techniques associated with using application interfaces.

BACKGROUND OF THE INVENTION

As Internet technology continually develops, more and more websites are formed. To enable users to acquire needed information, the majority of websites provide search functions. When a user needs to search for certain information, he or she can enter search keywords into a field associated with a search function of a website. The search function then looks up information associated with the website corresponding to the search keywords and presents the matching information at a search results page for the user.

In some instances, a website not only provides users with information that matches a search query, but also provides users with applications that correspond to the search keywords. An application may comprise a software application whose corresponding application interface is displayed at a website. Some websites have embedded application interfaces where application interfaces of matching applications may appear at a search results page of a website, for example. An application interface may resemble a form, for example, and include one or more input fields. When an application interface is displayed at the website, a user may directly enter information into the input fields of the application interface. After the input fields of an application interface are completed, the information entered in the input fields may be submitted by selecting a control associated with the application interface. The submitted information is then processed based on a function associated with the application and processing results may be displayed for the user.

For example, an application may be related to purchasing train tickets. A user who wants to purchase train tickets may want to use a train ticket purchasing application. In this case, the user may enter the search keywords "train ticket" into the website's search field. The website will then provide the user with the train ticket purchasing application at the search results page, for example. Upon accessing the application interface of the train ticket purchasing application, the user may enter the corresponding information in corresponding areas of the application interface. For example, an example of the application interface of a train ticket purchasing application may include input fields such as "Departure City" and "Destination City." The user may input "Beijing" in the "Departure City" input field and "Tianjin" in the "Destination City" input field. Once the control of the application interface is selected, the website will search for train trips with the "Departure City" of "Beijing" and the "Destination City" of "Tianjin" and will provide the train trip information that it finds to the user.

However, entering information into numerous input fields of an application interface may be very challenging and time consuming, especially on a smaller screen of a mobile device. For example, the user would need to select an input field, type/input the corresponding information into the input field and repeat the process for however many input fields there are in the application interface. If the application interface contains a relatively large number of input fields, then the user will have to make several input field selections and will have to enter information several times, which could take up a great amount of mobile terminal processing resources and also use up a significant amount of the mobile terminal battery.

BRIEF DESCRIPTION OF THE DRAWINGS

Various embodiments of the invention are disclosed in the following detailed description and the accompanying drawings.

FIG. 7 is a diagram showing an example of an application interface of a mobile phone recharging application without values being prepopulated into any of the input fields.

DETAILED DESCRIPTION

Figure 1:
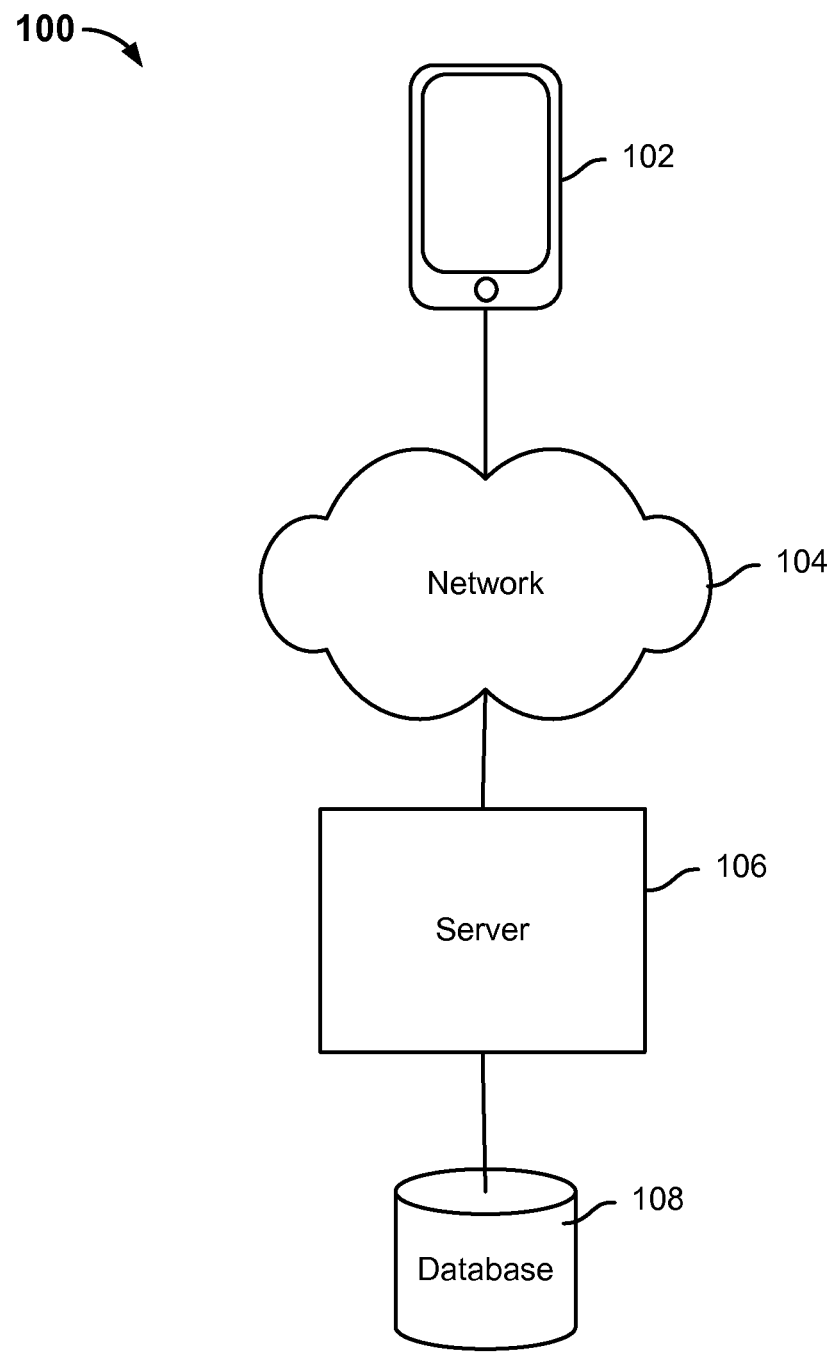
FIG. 1 is a diagram showing an embodiment of a system for completing an application interface.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of completing application interfaces are described herein. A search query is received at a website. The search query is segmented into one or more keyword units. An application interface is determined based at least in part on the one or more keyword units. The attributes corresponding to the input fields of the application interface are determined. Values corresponding to the input fields are determined based at least in part on the one or more keyword units. The determined values are configured to be entered into the corresponding input fields of the application interface. In some embodiments, the application interface with at least some of its input fields prepopulated with values determined based at least in part on the one or more keyword units from the search query is embedded in a search results page returned in response to the search query. In some embodiments, processing results from the application corresponding to the application interface processing the values input into the input fields of the application interface are displayed with other search results.

FIG. 1 is a diagram showing an embodiment of a system for completing an application interface. In the example, system 100 includes client device 102, network 104, server 106, and database 108. Network 104 includes high-speed data networks and/or telecommunication networks.

Client device 102 is configured to communicate with server 106 over network 104. While client device 102 is shown to be a smart phone, other examples of client device 102 are a laptop computer, a desktop computer, a mobile device, a tablet device, and/or any other computing device. Client device 102 includes an input interface (e.g., a physical keyboard or touchscreen) through which a user may input characters and also a display interface at which information may be displayed for the user. In various embodiments, client device 102 is configured to communicate with server 106 to perform completion of application interfaces at client device 102. In various embodiments, completion of an application interface refers to prepopulating the input field(s) of an application interface relevant to a search query based on keyword unit(s) from the search query. In various embodiments, an input field includes an input box, an input area, and a selection field.

Server 106 may be associated with a website that includes a search function. A user using client device 102 may access the website by accessing a web address associated with the website using a web browser application that is executing on client device 102. The user may input a search query into a search field associated with the search function. In response to receiving the search query, server 106 is configured to find at least an application interface that is relevant to the search query. The application interface is associated with an application that is configured to perform a particular function (e.g., purchasing a lottery ticket, purchasing a plane ticket, performing language translation of a phrase, etc.) and the application interface includes at least one or more input fields through which values are to be entered. The values entered into the input fields of the application interface are to be processed by the application based on the function of the application. The input fields and their respective attributes of an application interface may be configured for each different application and such information may be stored by server 106 in database 108.

As will be described in further detail below, server 106 is configured to prepopulate at least some of the input fields of the relevant application interface with some of the keyword units from the search query and present the application interface (including the prepopulated values) at the website (e.g., at a search results page) for the user. In some embodiments, the processing results from the application processing the prepopulated values entered into input fields of the application interface are also presented at the website (e.g., at a search results page) for the user. By presenting the application interface with prepopulated values that are related to the search query, the user may save time and effort that would have otherwise been used to populate the application interface with desired values. The input interface of mobile devices may be inconvenient to use to input many characters and so prepopulating values for an application interface that is relevant to the user's search query may be particularly helpful if client device 102 were a mobile device.

Figure 2:
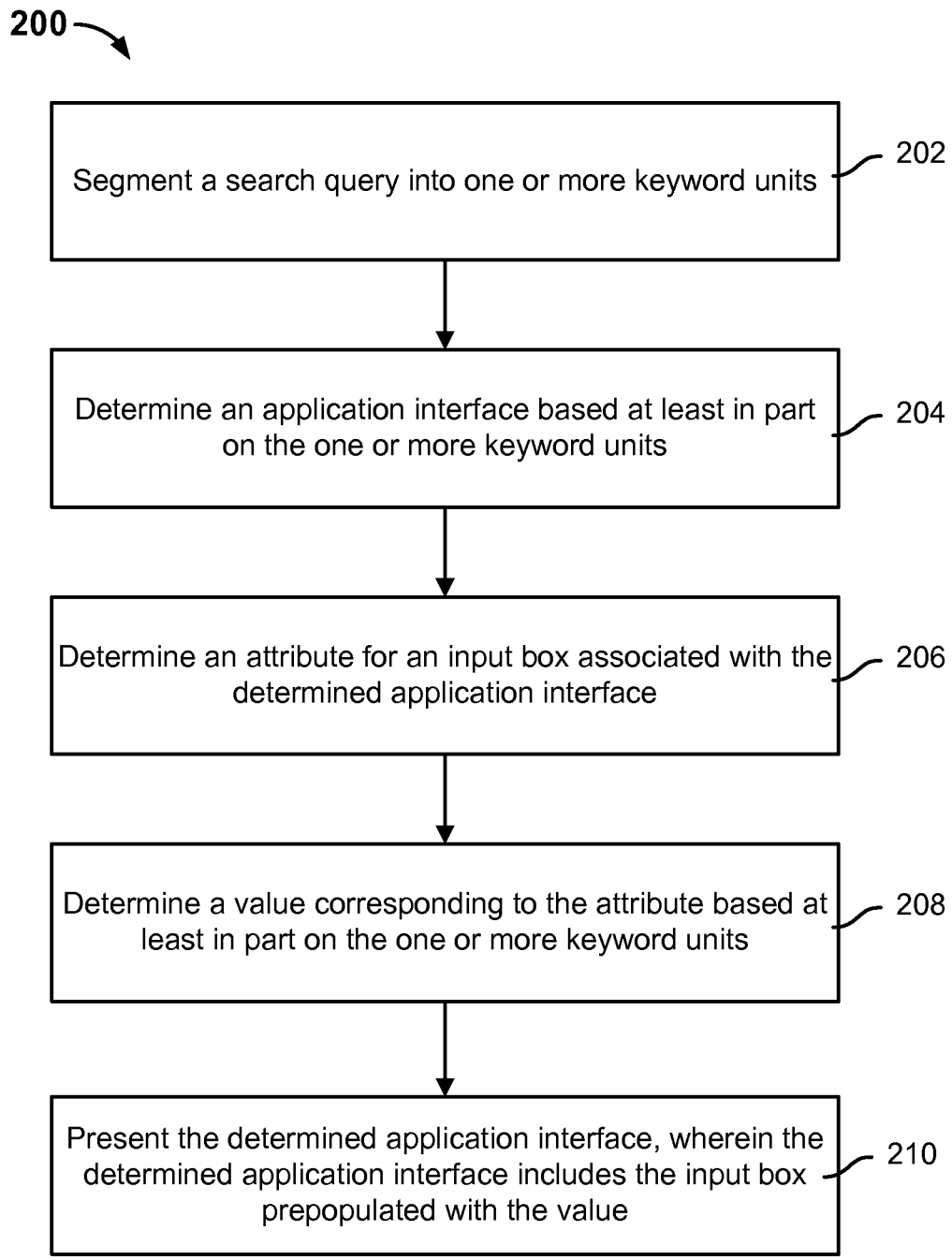
FIG. 2 is a flow diagram showing an embodiment of a process for completing an application interface.

FIG. 2 is a flow diagram showing an embodiment of a process for completing an application interface. In some embodiments, process 200 is implemented at system 100 of FIG. 1.

Process 200 is used to automatically prepopulate at least some of the input fields at an application interface based on keyword units determined from a search query. By applying process 200, for a search query that is received from a user, an application interface that matches to at least a keyword unit of the search query and whose input fields are prepopulated with values determined from the keyword unit(s) of the search query is presented to the user. Prepopulating input fields of an application interface that is relevant to the search query of a user will save the user time and effort that would have otherwise been spent on manually completing the application interface.

At 202, a search query is segmented into one or more keyword units.

In some embodiments, a user may perform a search at a website by submitting a search query into the search field associated with the website. The search function of the website may search for both matching information and matching applications for a given search query. The received search query may be subject to a normalization treatment, in some embodiments. For example, during a normalization treatment, unnecessary words and extra spaces may be removed from a search query, upper case characters of the search query may be converted to lower case counterparts, traditional Chinese characters may be converted into simplified Chinese characters, punctuation marks may be removed from the search query, and numerical formats may be converted into different formats.

After performing a normalization treatment, the search query is segmented into one or more keyword units. The search query may comprise a string of search keywords and a keyword unit may comprise a known keyword or phrase. The segmentation may be based on, but is not limited to, statistical segmentation techniques, for example. In some embodiments, a language bank that includes known keyword units is used to segment the search query into one or more keywords. The search keywords are then matched against each segment in the language bank, and each search keyword that matches a segment in the language bank is confirmed as a segmented keyword unit. For example, the search query "airplane ticket Beijing Shanghai" may be segmented into the search keywords of "airplane ticket," "Beijing," and "Shanghai." Then each of search keywords "airplane ticket," "Beijing," and "Shanghai" is matched to a segment in a language bank and it is confirmed that each of "airplane ticket," "Beijing," and "Shanghai" is a keyword unit.

At 204, an application interface is determined based at least in part on the one or more keyword units.

In various embodiments, a predetermined application interface library is used to determine the application interface. The predetermined application interface library includes mappings between keyword units to corresponding application interfaces. Each application interface comprises an interface associated with an application. The application interface includes input fields and/or selections that are to be displayed to a user. Values are received through the input fields of the application interface and the application processes the received information based on a function/type associated with the application. Examples of application types includes an airplane ticket purchasing application, a train ticket purchasing application, a lottery ticket purchasing application, and a translation application. In some embodiments, the application interface library may be predetermined prior to implementing process 200.

Below are two embodiments of determining an application interface based on the keyword unit(s) determined from the search query:

Embodiment 1 of determining an application interface:

In Embodiment 1 of determining an application interface, the predetermined application interface library stores mappings between keyword unit(s) and application interfaces. To determine the application interface based on the keyword units determined from a search query, each of at least a subset of the keyword units determined from the search query is compared against mappings of keyword units to application interfaces of the predetermined application interface library. If a first keyword unit does not match any keyword units of the stored predetermined application interface library, then the next keyword unit, if one exists, is selected and compared against the mappings of keyword units to application interfaces of the stored predetermined application interface library. The process continues for each keyword unit determined from the search query until a match is found. The stored application interface corresponding to the matching keyword unit is identified as the application interface to use for further processing. In some embodiments, the sequence in which each of the one or more keyword units is selected and compared against the mappings of keyword units to application interfaces of the stored predetermined application interface library is based on a preset keyword unit matching sequence. For example, the preset keyword unit matching sequence comprises the left-to-right positions in which the keyword unit(s) appeared in the search query.

For example, the received search query is "Beijing Shanghai train ticket." The segmented keyword units are "Beijing," "Shanghai," and "train ticket." The preset keyword unit matching sequence comprises the left-to-right positions in which the keyword unit(s) appeared in the search query. That is, the keyword unit matching sequence is "Beijing"→"Shanghai"→>"train ticket." The first keyword unit selected to be matched against the entries of the predetermined application interface library is "Beijing." The matching result for "Beijing" is a match failure because the keyword unit "Beijing" does not match any entries of the predetermined application interface library. Therefore, the second keyword unit "Shanghai" is selected to be matched against the entries of the predetermined application interface library. Again, the matching result for "Shanghai" is a match failure. Then the third keyword unit, "train ticket," is selected. The matching result of "train ticket" is a match success because the keyword unit "train ticket" has matched an entry of the predetermined application interface library. The matching process therefore ends in the example.

However, if all of the matching results for the segments keyword units are match failure (i.e., none of the keyword units match an entry of the predetermined application interface library), then an application interface may not be determined and instead, information that matches the search query is found and presented at a search results page for the user.

Table 1 below shows an example of a predetermined application interface library. As shown in Table 1, the left column includes various keyword units, the middle column includes application interface indices that correspond to one or more keyword units, and the right column shows application interfaces that correspond to application interface indices and the one or more keyword units. For example, Keyword units 1, 2, and 3 correspond to Application interface index a and Application interface A. An application interface index a may comprise some data that may be used to retrieve the data associated with corresponding Application interface A. For example, application interface index a may comprise a location at which the data associated with corresponding Application interface A is stored. Data associated with an Application interface A may be used to display Application interface A at a webpage.

TABLE 1

| Keyword unit | Application interface index | Application interface |
| --- | --- | --- |
| Keyword unit 1 | Application interface index a | Application interface A |
| Keyword unit 2 | | |
| Keyword unit 3 | | |
| Keyword unit 4 | Application interface index b | Application interface B |
| Keyword unit 5 | | |
| Keyword unit 6 | Application interface index c | Application interface C |
| Keyword unit 7 | | |

In Embodiment 1 of determining an application interface, when a selected keyword unit is being compared to entries of the predetermined application interface library, the selected keyword unit determined from the search query may be compared against the keyword units stored in the Keyword unit column to determine a match. If a match can be found between the selected keyword unit and a stored keyword unit, then the application interface index corresponding to the matching stored keyword unit in Table 1 is used to determine the application interface to which the selected keyword unit is determined to match. For example, the corresponding application interface index may also be used to retrieve data associated with the corresponding application interface.

For example, a current selected keyword unit is keyword unit 4. When the selected keyword unit is to be matched with entries of the predetermined application interface library, the following occurs: It is determined that the selected keyword unit matches the entry of the predetermined application interface library that includes keyword unit 4 and the application interface index corresponding to keyword unit 4 is looked up among the correspondences between keyword units and application interface indices shown in Table 1. The application interface index corresponding to keyword unit 4 is determined to be application interface index b. Then, the matching application interface index b is used to determine a corresponding application interface, which is Application interface B. Thus, Application interface B is determined as the application interface based on keyword unit 4.

Embodiment 2 of determining an application interface:

In Embodiment 2 of determining an application interface, the predetermined application interface library stores mappings between keyword unit categories and application interfaces. Table 2 below shows an example of a predetermined application interface library. As shown in Table 2, the left column includes various keyword unit categories, the middle column includes application interface indices that correspond to one or more keyword units, and the right column shows application interfaces that correspond to application interface indices and the one or more keyword unit categories. An example of a keyword unit category is a phone number. For example, Keyword unit categories 1, 2, and 3 correspond to Application interface index a and Application interface A. An Application interface index a may comprise some data that may be used to retrieve the data associated with corresponding Application interface A. For example, Application interface index a may comprise a location at which the data associated with corresponding Application interface A is stored.

TABLE 2

| Keyword unit category | Application interface index | Application interface |
|---|---|---|
| Keyword unit category 1 | Application interface index a | Application interface A |
| Keyword unit category 2 | | |
| Keyword unit category 3 | | |
| Keyword unit category 4 | Application interface index b | Application interface B |
| Keyword unit category 5 | | |

In Embodiment 2 of determining an application interface, when a selected keyword unit is to be compared with entries of the predetermined application interface library, the first step is to determine the keyword unit category to which the selected keyword unit belongs. Then the application interface index corresponding to the determined keyword unit category is looked up among correspondences between keyword unit categories and application interface indices in Table 2. If a match can be found between the determined keyword unit category and a stored keyword unit category, then the application interface index corresponding to the matching stored keyword unit category in Table 2 is used to determine the application interface to which the selected keyword unit is determined to match. For example, the corresponding application interface index may also be used to retrieve data associated with the corresponding application interface.

In some embodiments, which keyword unit category a keyword unit belongs to is determined based on predetermined ascertaining rules. For example, ascertaining rules may be predetermined for each keyword unit category. The predetermined ascertaining rules corresponding to a keyword unit category may be stored in the predetermined application interface library with each corresponding keyword unit category. For example, when the keyword unit category to which a selected keyword unit belongs is to be determined, a determination may be as to whether the selected keyword unit belongs to each keyword unit category in the predetermined application interface library based on the predetermined ascertaining rules corresponding to that keyword unit category. For example, the predetermined ascertaining rules corresponding to the keyword unit category of "mobile phone number" are: First determine whether the keyword unit comprises an N-digit number series (N can be 10, 11, 13, or other appropriate number depending on the requirements of the service provider/country and is assumed to be 13 for the examples below). If the determination result is positive, then determine whether the number series in the first three positions in the 13-digit number series is one of the preset number series "131," "132," "138," etc. If the assessment result is positive, then determine that the keyword unit category to which the keyword unit belongs is "mobile phone number."

For example, when a selected keyword unit is compared with entries of the predetermined application interface library, the first step is to determine the keyword unit category to which the selected keyword unit belongs. In the example, the determined keyword unit category is keyword unit category 3. The application interface index corresponding to keyword unit 3 is looked up among the correspondences between keyword unit categories and application interface indices stored in Table 2. The matching application interface index is application interface index a. Then, the matching application interface index a is used to determine a corresponding application interface, which is Application interface A. Thus, Application interface A is determined as the application interface based on the selected keyword unit.

In some embodiments, either Embodiment 1 or Embodiment 2 of determining an application interface may be used to determine an application interface based on keyword unit(s) determined from a search query. For example, the application interface is determined based on first using Embodiment 1 and in the event that an application interface cannot be determined using Embodiment 1, then Embodiment 2 is used. In another example, the application interface is determined based on first using Embodiment 2 and in the event that an application interface cannot be determined using Embodiment 2, then Embodiment 1 is used.

At 206, an attribute is determined for an input field associated with the determined application interface.

In various embodiments, each application interface includes one or more input fields. Each input field is associated with at least one attribute. For example, each input field may be associated with being placed at a certain location within the application interface. For example, an attribute may be identified by a name or a format of a value to be entered in the corresponding input field. For example, an airplane ticket purchasing application interface may include at least three input fields. One of the input fields is for entering the departure city, and thus the attribute of this input field is associated with the name of "Departure City." A second of the input fields is for entering the destination city, and thus the attribute of this input field is associated with the name of "Destination City." A third of the input fields is for entering the departure date, and thus the attribute of this input field is associated with the name of "Departure Date."

In various embodiments, mappings of an application interface to corresponding input fields and a mapping of each of such input fields to an attribute are stored for the application interface at the predetermined application interface library. For example, an attribute is determined for each input field of an application interface and the correspondence is stored for the application interface. Table 3 shows the mappings of application interfaces to corresponding input fields and a mapping of each of such input fields to an attribute:

TABLE 3

| Application interface | Input field | Attribute of input field |
| --- | --- | --- |
| Application interface A | Input field A1 | Attribute of input field A1 |
|  | Input field A2 | Attribute of input field A2 |
|  | Input field A3 | Attribute of input field A3 |
| Application interface B | Input field B1 | Attribute of input field B1 |
|  | Input field B2 | Attribute of input field B2 |
| Application interface C | Input field C1 | Attribute of input field C1 |
|  | Input field C2 | Attribute of input field C2 |

To determine the attributes corresponding to the input fields of an application interface determined in 204, Table 3 may be looked up. For example, assuming that the application interface determined in 204 is Application interface C, then it can be determined using Table 3 that Application interface C has Input field C1, which is associated with Attribute of input field C1, and Input field C2, which is associated with Attribute of input field C2.

At 208, a value corresponding to the attribute is determined based at least in part on one or more of the keyword units.

Values corresponding to attributes associated with at least some of the input fields associated with an application interface are determined based on the keyword units determined from the search query.

Below are two embodiments of determining values corresponding to input fields associated with an application interface:

Embodiment 1 of determining values corresponding to input fields:

An attribute corresponding to each keyword unit associated with the search query is determined. Then for each input field included in the determined application interface, a keyword unit, if any, associated with the search query that corresponds to the attribute of the input field is directly used as the value to be entered into the input field.

In some embodiments, a set of keyword unit attribute ascertaining rules is set up in advance for each application interface. For example, a set of keyword unit attribute ascertaining rules may include a mapping of an attribute for each of one or more keyword units. The sets of keyword unit attribute ascertaining rules may be stored for corresponding application interfaces in a predetermined application interface library. In determining the attribute of each keyword unit, the set of keyword unit attribute ascertaining rules corresponding to the determined application interface may be first retrieved from the predetermined application interface library. Then the attribute of each keyword unit may be determined based on the retrieved set of keyword unit attribute ascertaining rules.

In some embodiments, the set of keyword unit attribute ascertaining rules may be different for each type of application interface. For example, the set of keyword unit attribute ascertaining rules corresponding to the application interface of an airplane ticket purchasing application is as follows: First, whether the keyword units are place names is determined. If the determination result is positive, then the keyword units are examined from the left-to-right positions in which the keyword unit(s) appeared in the search query. It is determined whether a keyword unit of the one or more keyword units comprises the first location name that appears or the second location name that appears in the search query when each of the keyword units is considered from left-to-right based on their respective positions in the search query. If it is determined that the keyword unit is the first location name (e.g., based on comparing the keyword unit to a list of known location names), then the attribute of the keyword unit is determined to be associated with the name of "Departure City." If a keyword unit is determined to be the keyword unit that is the second location in the search query when the keyword units are considered from left-to-right, then the attribute of the keyword unit is determined to be associated with the name of "Destination City." Therefore, the keyword unit that is associated with the attribute with the name of "Departure City" is entered into the input field associated with the attribute with the name of "Departure City" and the keyword unit that is associated with the attribute with the name of "Destination City" is entered into the input field associated with the attribute with the name of "Destination City." For example, in the application interface of an airplane ticket purchasing application, the keyword unit "Beijing" is determined to be associated with the attribute with the name of "Departure City" and is therefore entered into the input field associated with the attribute name of "Departure City." Also, the keyword unit "Shanghai" is determined to be associated with the attribute with the name of "Destination City" and is therefore entered into the input field associated with the attribute name of "Destination City."

For example, the set of keyword unit attribute ascertaining rules corresponding to the application interface of a lottery ticket purchasing application is as follows: Multiple lottery ticket types and modes of playing the lottery are predetermined for the set of attribute ascertaining rules corresponding to the application interface of a lottery ticket purchasing application. It is determined whether any of the one or more keyword units correspond to one of the predetermined lottery types. If a predetermined lottery type is matched by a particular keyword unit, then the attribute of the matching keyword unit is determined to be associated with the name of "Lottery Ticket Type." Therefore, the keyword unit that is associated with the attribute with the name of "Lottery Ticket Type" is entered into the input field associated with the attribute with the name of "Lottery Ticket Type." If none of the predetermined lottery types matches any of the keyword units, then it is determined whether any of the keyword units matches one of the predetermined lottery playing modes. If a predetermined lottery playing mode is matched by a particular keyword unit, then the attribute of the matching keyword unit is determined to be associated with the name of "Mode of Play." Therefore, the keyword unit that is associated with the attribute with the name of "Mode of Play" is entered into the input field associated with the attribute with the name of "Mode of Play."

For example, the set of keyword unit attribute ascertaining rules corresponding to the application interface of a mobile phone number recharging application is as follows: Determine whether a keyword unit of the set of one or more keyword units is a mobile phone number (e.g., based on comparing the keyword unit to a format associated with a mobile phone number). If a keyword unit is determined to be a mobile phone number, then the attribute of the keyword unit is determined to be associated with the name of "Mobile Phone Number to Be Recharged." Therefore, the keyword unit that is associated with the attribute with the name of "Mobile Phone Number to Be Recharged" is entered into the input field associated with the attribute with the name of "Mobile Phone Number to Be Recharged."

For example, the set of keyword unit attribute ascertaining rules corresponding to the application interface of a translation application is as follows: The keyword units are arranged in an order corresponding to their respective left-to-right positions in the search query. For each keyword unit in the arranged sequence from left-to-right, it is determined whether the keyword unit comprises a first keyword unit in the sequence other than the keyword unit that was used to match the determined application interface associated with the translation application. In a simple example, a keyword unit that was used to match to the determined translation application interface comprises the word "translation." If the keyword unit is determined to be the first keyword unit in the sequence that is other than the keyword unit that was used to match to the determined translation application interface, then the attribute of the keyword unit is determined to be associated with the name of "Word to Be Translated." Therefore, the keyword unit that is associated with the attribute with the name of "Word to Be Translated" is entered into the input field associated with the attribute with the name of "Word to Be Translated." If the keyword unit is not determined to be the first keyword unit in the sequence that is other than the keyword unit that was used to match to the determined translation application interface, then it is determined whether the keyword unit corresponds to one of a predetermined language type (e.g., based on a predetermined list of languages and corresponding language types). If the keyword unit is not determined to corresponding to a predetermined language type, then the attribute of the keyword unit is determined to be associated with the name of "Translated Language." Therefore, the keyword unit that is associated with the attribute with the name of "Translated Language" is entered into the input field associated with the attribute with the name of "Translated Language."

Embodiment 2 of determining values corresponding to input fields:

The attribute corresponding to each keyword unit associated with the search query is determined. Then for each input field included in the determined application interface, a keyword unit, if any, associated with the search query that corresponds to the attribute of the input field is used to determine a value to be entered into the input field. Therefore, unlike in Embodiment 1 of determining values corresponding to input fields above, a value for an input field is determined based on a keyword unit but the keyword unit is not necessarily directly used as the value to be entered into the input field.

For example, the application interface of a mobile phone recharging application includes an input field with the attribute with the name of "Carrier." When the value corresponding to this input field is to be determined, it is first determined whether a keyword unit of the one or more keyword units is a mobile phone number (e.g., based on determining whether the keyword unit is in a format that corresponds to a format of a mobile phone number). If a keyword unit is determined to be a mobile phone number, then the keyword unit that is determined to be the mobile phone number is used as a basis to determine the mobile carrier to which the mobile phone number belongs. For example, the corresponding mobile carrier may be determined for a mobile phone number by querying a database associated with storing data associated with the mobile carrier for each of various mobile phone numbers. Then the mobile carrier determined based on the keyword unit that is a mobile phone number is determined to be used as the value corresponding to the input field associated with the attribute with the name of "Carrier."

In some embodiments, either one of Embodiment 1 or Embodiment 2, as described above, may be used to determine values corresponding to input fields of the determined application interface. In some embodiments, Embodiment 1 is used and if a value cannot be determined for at least one of the input fields, then Embodiment 2 is used to determine the value of the input field(s) for which Embodiment 1 did not determine a value. In some embodiments, Embodiment 2 is used and if a value cannot be determined for at least one of the input fields, then Embodiment 1 is used to determine the value of the input field(s) for which Embodiment 2 did not determine a value.

In some embodiments, if a value cannot be determined for at least one of the input fields based on either or both of Embodiment 1 and Embodiment 2 for determining values corresponding to input fields, then a default value that was predetermined for an input field is entered into the input field. For example, in the application interface corresponding to an airplane ticket purchasing application, if none of the keyword units corresponds to a date value, then the current date is used as the value corresponding to the input field associated with the attribute with the name of "Departure Date." In another example, in the application interface corresponding to a lottery ticket purchasing application, if none of the keyword units correspond to a predetermined lottery ticket type, then the default value of "Double Color Ball" is entered into the "Lottery Ticket Type" input field, and if none of the keyword units correspond to a predetermined mode of play type, then the default value of "One Computer-Selected Play" is entered into the "Mode of Play" input field.

At 210, the determined application interface is presented, wherein the determined application interface includes the input field prepopulated with the value.

In some embodiments, the application interface with at least some of its input fields prepopulated with values determined based on the keyword units is displayed at the website at which the search took place. In some embodiments, the application interface may be displayed at a location on the search results page returned based on the initial search query. For example, the search results page may include information that matches the search query as well as the determined application interface with at least some input fields prepopulated with the determined values. The application interface may be displayed at the top or bottom of the search results page, for example.

In some embodiments, in addition to displaying the application interface with at least some of its input fields prepopulated with values, some of the processing results of the application associated with the application interface may be displayed as well (e.g., at the search results page). Prior to displaying the search results page with the presentation of the application interface, the application associated with the application interface, in some embodiments, is configured to process the values entered into the input fields of the application interface based on a function associated with the application. As such, processing results may be displayed with the application interface with at least some of its input fields prepopulated with values. Thus, the user may easily see the application processing results on the same page as the search results for a search query. If these processing results are what the user needs, then he or she will not need to manually enter the relevant information into each input field, nor will the user need to confirm whether the values prepopulated into the input fields of the application interface are correct. Therefore, presenting processing results can effectively simplify and improve a user's search experience. If these processing results are not what the user needs, then the user can also manually revise the prepopulated values of the input fields and then select the control associated with the application interface that causes the application to process the revised values. By prepopulating the input fields of a relevant application interface, the use of the application may be simplified for the user.

For example, the application interface corresponding to a translation application includes three input fields which have the following attributes associated with the names: "Word to Be Translated," "Pre-Translation Language," and "Post-Translation Language." The search keywords entered by the user are "翻译 [translate] 苹果 [apple] 英文 [English]." The keyword units determined from segmenting the search query are "翻译 [translate]," "苹果 [apple]," and "英文 [English]." The keyword unit "翻译 [translate]" is found to match a stored keyword unit in a predetermined application interface library corresponding to the application interface corresponding to a translation application. Then it is determined that "苹果 [apple]" relates to the input field associated with the attribute with the name of "Word to Be Translated" of the application interface and that "英文 [English]" relates to the input field associated with the attribute with the name of "Post-Translation Language." Therefore, "苹果 [apple]" is determined as the value to be entered into the input field associated with the attribute with the name "Word to Be Translated." "英文 [English]" is determined as the value to be entered into the input field associated with the attribute with the name "Post-Translation Language." The word that is to be translated, "苹果 [apple]," is used as a basis for determining that the pre-translation language is Chinese. Therefore, "中文 [Chinese]" is determined as the value to be entered into the input field associated with the attribute with the name "Pre-Translation Language." After an attribute value has been entered into each of the input fields, the appropriate application processing can be carried out according to each entered value to obtain the English translation result of "apple" for "苹果 [apple]." Then this translation result and the application interface with the prepopulated values entered are presented to the user, such as at the search results page returned for the original search query. So the user not only can directly learn the English translation result for "苹果 [apple]" from just viewing the search results page but also, if the user wishes to know the translation result for "苹果 [apple]" in another language (such as Japanese), he or she can flexibly revise the value entered in the "Post-Translation Language" input field in the application interface and then select the control associated with the application interface that causes the application to process the revised values.

FIGS. 3 through 10 describe various examples of prepopulating at least some input fields of different types of application interfaces based on keyword units determined from a search query. In the examples of FIGS. 3 through 10, some examples of sets of keyword unit attribute ascertaining rules corresponding to different types of application interfaces described above are used.

Figure 3:
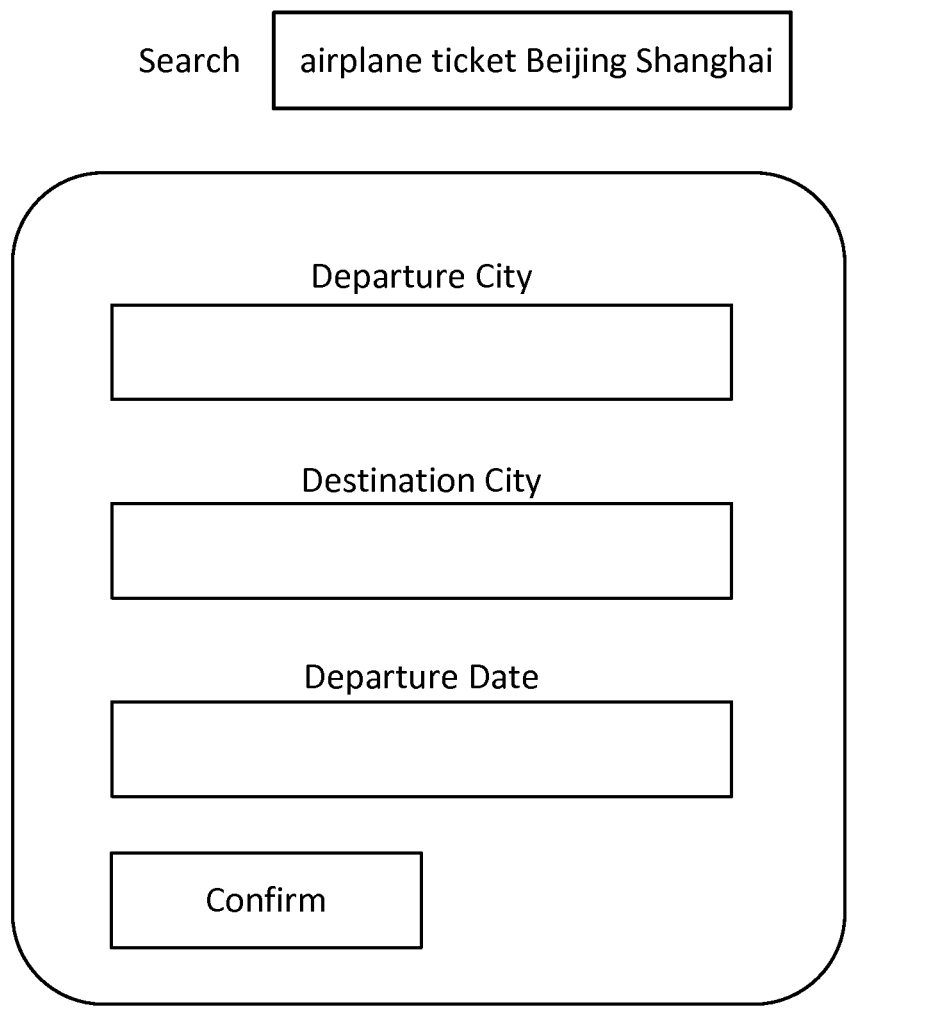
FIG. 3 is a diagram showing an example of an application interface of an airplane ticket purchasing application without values being prepopulated into any of the input fields.

FIG. 3 is a diagram showing an example of an application interface of an airplane ticket purchasing application without values being prepopulated into any of the input fields. It includes three input fields corresponding to the respective name attributes of "Departure City," "Destination City," and "Departure Date." The search query input by the user is "airplane ticket Beijing Shanghai," and the determined keyword units are "airplane ticket," "Beijing," and "Shanghai." The keyword unit "airplane ticket" is found to match to a stored keyword unit corresponding to the application interface of an airplane ticket purchasing application. Then it is determined that the attribute associated with the keyword unit of "Beijing" for this application corresponds to the attribute with the name of "Departure City" for this application interface and that the attribute associated with the keyword unit of "Shanghai" corresponds to the attribute with the name of "Destination City" for this application interface. Therefore, "Beijing" is used as the value to be entered into the input field associated with the attribute with the name of "Departure City," and "Shanghai" is used as the value to be entered into the input field associated with the attribute with the name of "Destination City." In addition, the current date of "May 4, 2012" is used as the value to be entered into the input field associated with the attribute with the name of "Departure Date." Note that the default value of the current date is used for the input field associated with the attribute with the name of "Departure Date" because a corresponding keyword unit could not be determined among the keyword units associated with the search query.

Figure 4:
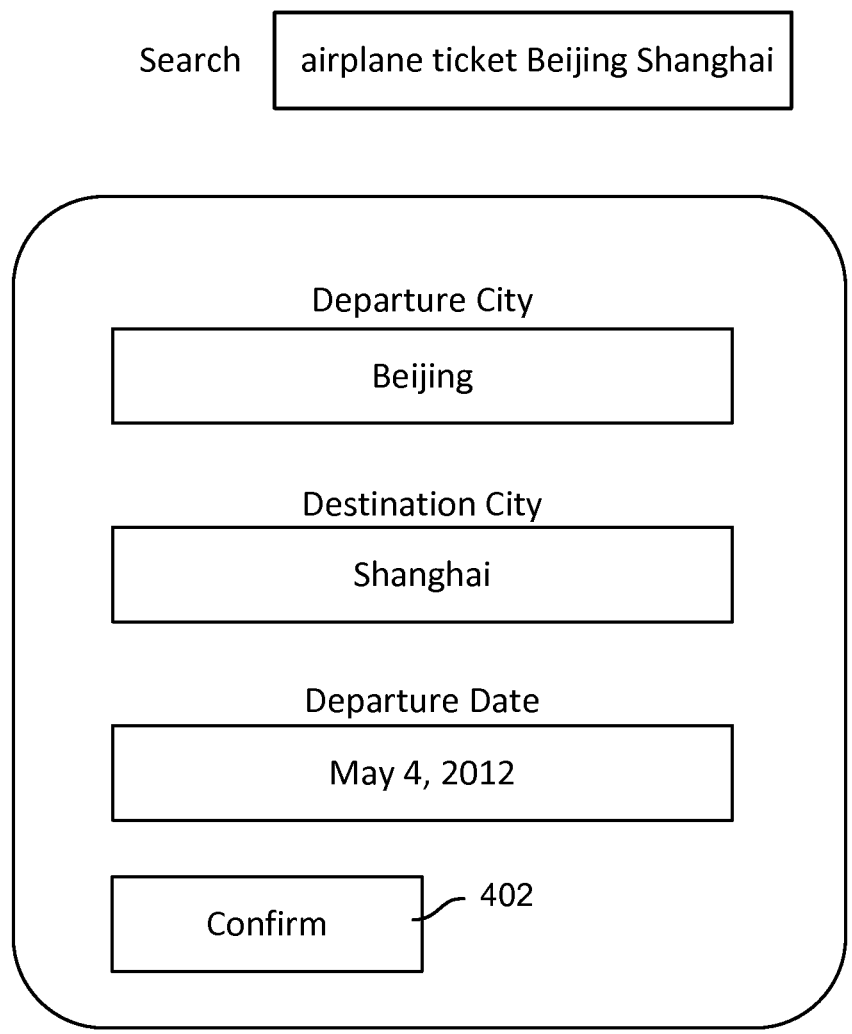
FIG. 4 is a diagram showing an application interface of an airplane ticket purchasing application with values having been prepopulated into the input fields.

FIG. 4 is a diagram showing an application interface of an airplane ticket purchasing application with values having been prepopulated into the input fields. In the example, the application interface of an airplane ticket purchasing application is the application interface that is described in FIG. 3 with the addition of the values described above being prepopulated into the appropriate input fields. The application interface with the prepopulated input fields may be presented to a user at a search results page in response to the user's search query for "airplane ticket Beijing Shanghai." The user may cause the airplane ticket purchasing application to process the entered values in the event that the user selects confirm button 402. In some embodiments, in addition to presenting the application interface with the prepopulated values, processing results by the application based on the prepopulated values may be presented as well. In this example, the processing results may include a list of different flights provided by various airlines that depart from Beijing on May 4, 2012 and arrive in Shanghai.

Figure 5:
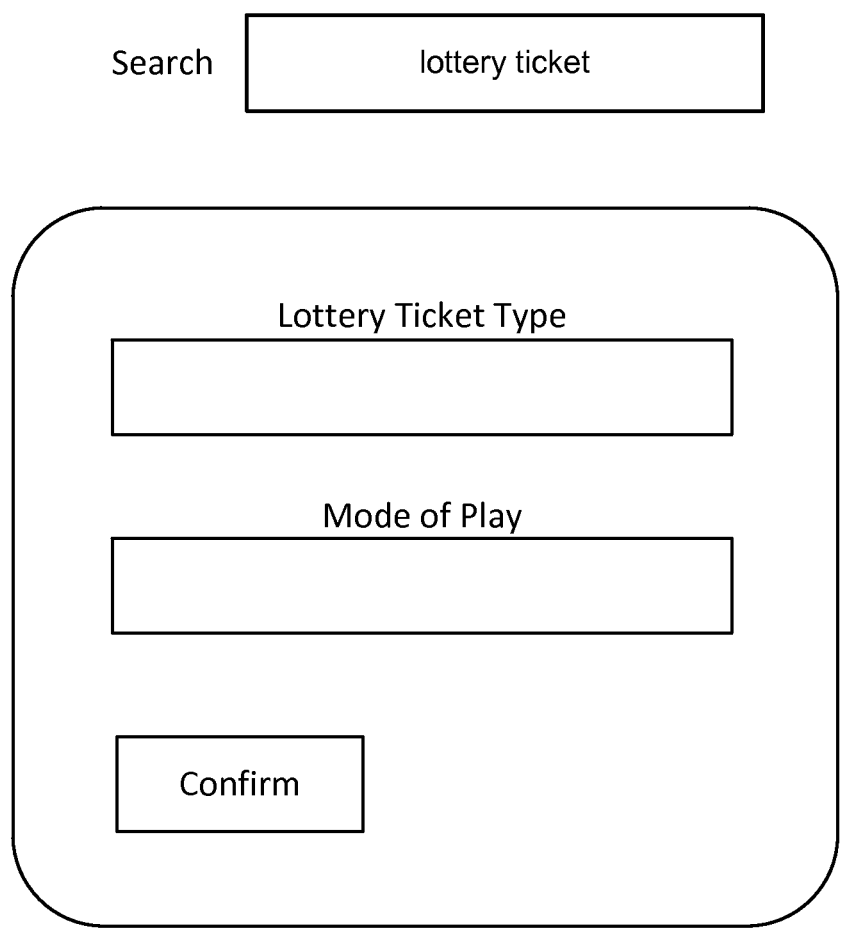
FIG. 5 is a diagram showing the application interface of a lottery ticket purchasing application without values being prepopulated into any of the input fields.

FIG. 5 is a diagram showing the application interface of a lottery ticket purchasing application without values being prepopulated into any of the input fields. The application interface includes two input fields corresponding to the respective name attributes of "Lottery Ticket Type" and "Mode of Play." The search query input by the user is "lottery ticket." The determined keyword unit is "lottery ticket." This keyword unit of "lottery ticket" is found to match a stored keyword unit corresponding to the application interface of a lottery ticket purchasing application. Because no keyword units are found to correspond to the attribute associated with the input field associated with the name attribute of "Lottery Ticket Type," the default value of "Double Color Ball" is used to be entered into the input field associated with the attribute with the name of "Lottery Ticket Type." Similarly, because no keyword units are found to correspond to the attribute associated with the input field associated with the name attribute of "Mode of Play," the default value of "One Computer-Selected Play" is used to be entered into the input field associated with the attribute with the name of "Mode of Play."

Figure 6:
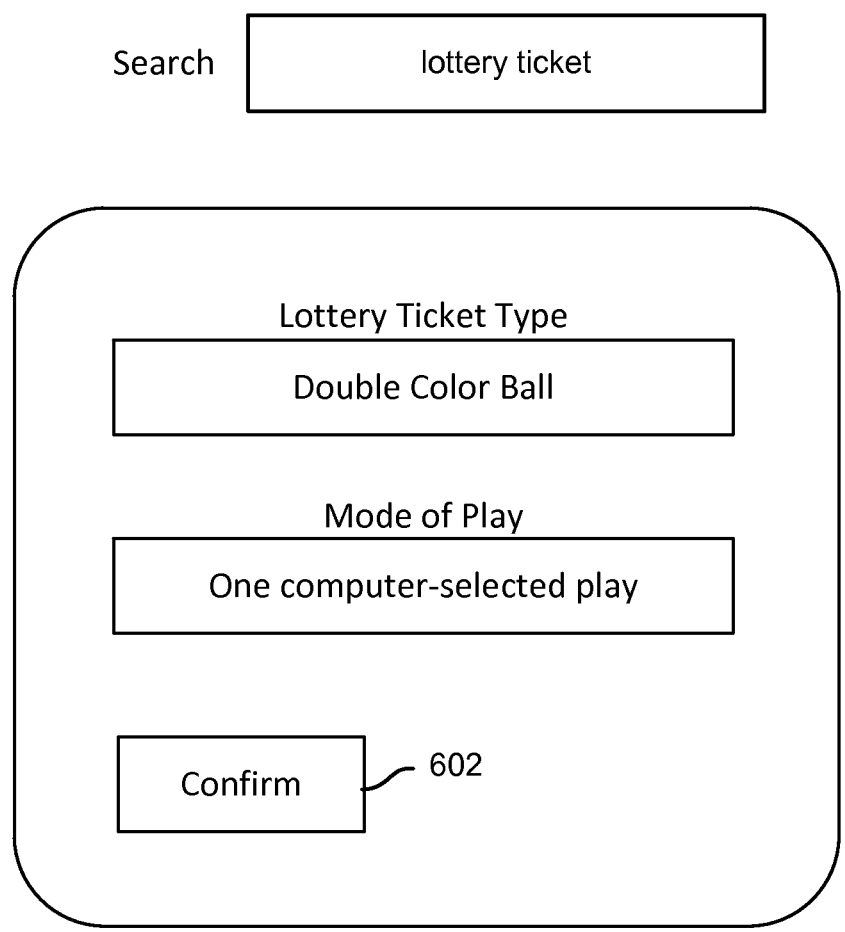
FIG. 6 is a diagram showing an application interface of a lottery ticket purchasing application with values having been prepopulated into the input fields.

FIG. 6 is a diagram showing an application interface of a lottery ticket purchasing application with values having been prepopulated into the input fields. In the example, the application interface of a lottery ticket purchasing application is the application interface that is described in FIG. 5 with the addition of the values described above being prepopulated into the appropriate input fields. The application interface with the prepopulated input fields may be presented to a user at a search results page in response to the user's search query for "lottery ticket." The user may cause the lottery ticket purchasing application to process the entered values in the event that the user selects confirm button 602. In some embodiments, in addition to presenting the application interface with the prepopulated values, processing results by the application based on the prepopulated values may be presented as well. In this example, the processing results may include a form that prompts the user for payment information for a lottery ticket.

FIG. 7 is a diagram showing an example of an application interface of a mobile phone recharging application without values being prepopulated into any of the input fields. A mobile phone recharging application may be used to add value to a mobile phone account associated with a prepaid service. So to "recharge" a mobile phone refers to adding value to the prepaid account associated with that phone. For example, the prepaid account for a mobile phone may be linked to the number of that mobile phone. The mobile phone recharging application interface includes three input fields corresponding to respective name attributes of "Mobile Phone Number to Be Recharged," "Carrier," and "Recharge Amount." The search query input by the user is "1381234567899," and the determined keyword unit is "1381234567899." This keyword unit of "1381234567899" is found to match a stored keyword unit corresponding to the application interface of a mobile phone recharging application. Then it is determined that the attribute associated with keyword unit "1381234567899" for this application corresponds to the attribute with the name of "Mobile Phone Number to Be Recharged" for this application. Therefore, "1381234567899" is used as the value to be entered into the input field associated with the attribute with the name of "Mobile Phone Number to Be Recharged." Based on the keyword unit "1381234567899," a carrier database is queried to determine the value for the input field with the attribute with the name of "Carrier" as "ABC Telecom Company." Then "ABC Telecom Company" is used as the value to be entered into the input field associated with the attribute with the name of "Carrier." In addition, the default value of "50," which is predetermined for the input field associated with the attribute with the name of "Recharge Amount" is used to be entered into the input field associated with the attribute with the name of "Recharge Amount."

Figure 8:
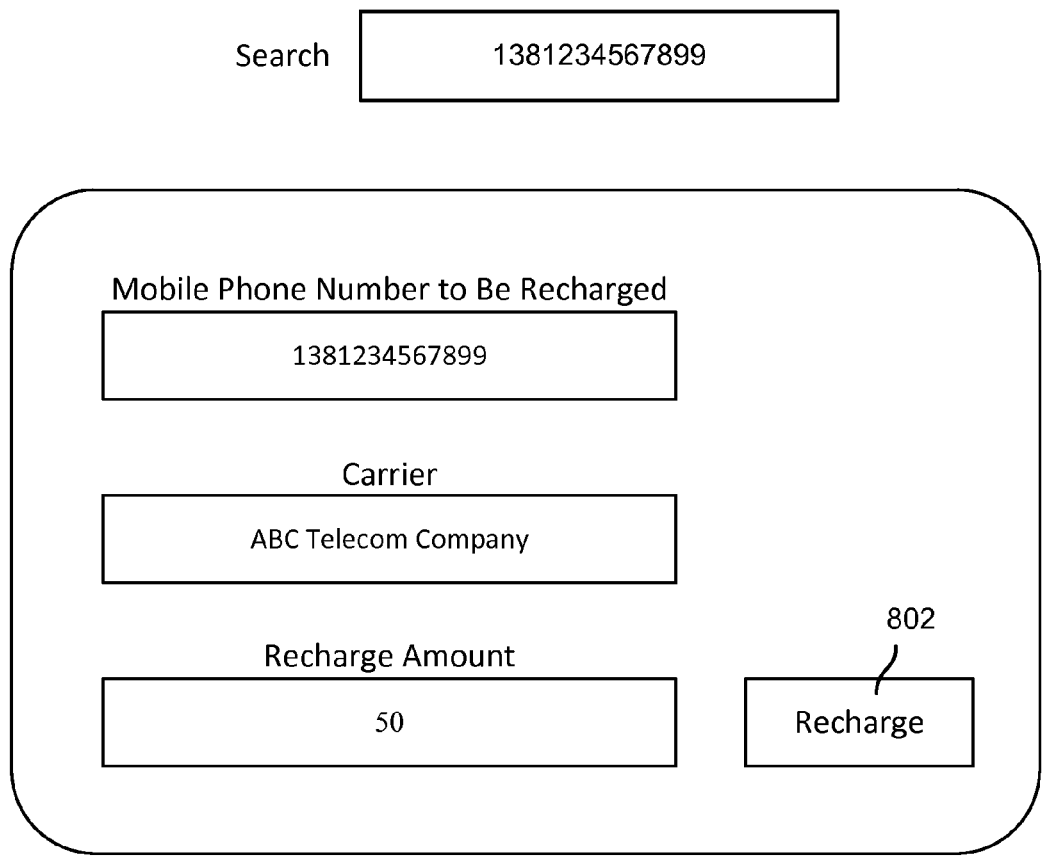
FIG. 8 is a diagram showing an application interface of a mobile phone recharging application with values having been prepopulated into the input fields.

FIG. 8 is a diagram showing an application interface of a mobile phone recharging application with values having been prepopulated into the input fields. In the example, the application interface of a mobile phone recharging application is the application interface that is described in FIG. 7 with the addition of the values described above being prepopulated into the appropriate input fields. The application interface with the prepopulated input fields may be presented to a user at a search results page in response to the user's search query for "1381234567899." The user may cause the mobile phone recharging application to process the entered values in the event that the user selects recharge button 802. In some embodiments, in addition to presenting the application interface with the prepopulated values, processing results by the application based on the prepopulated values may be presented as well. In this example, the processing results may include a confirmation that 50 units (e.g., dollars) have been added to the prepaid account linked to the mobile phone number of "1381234567899."

Figure 9:
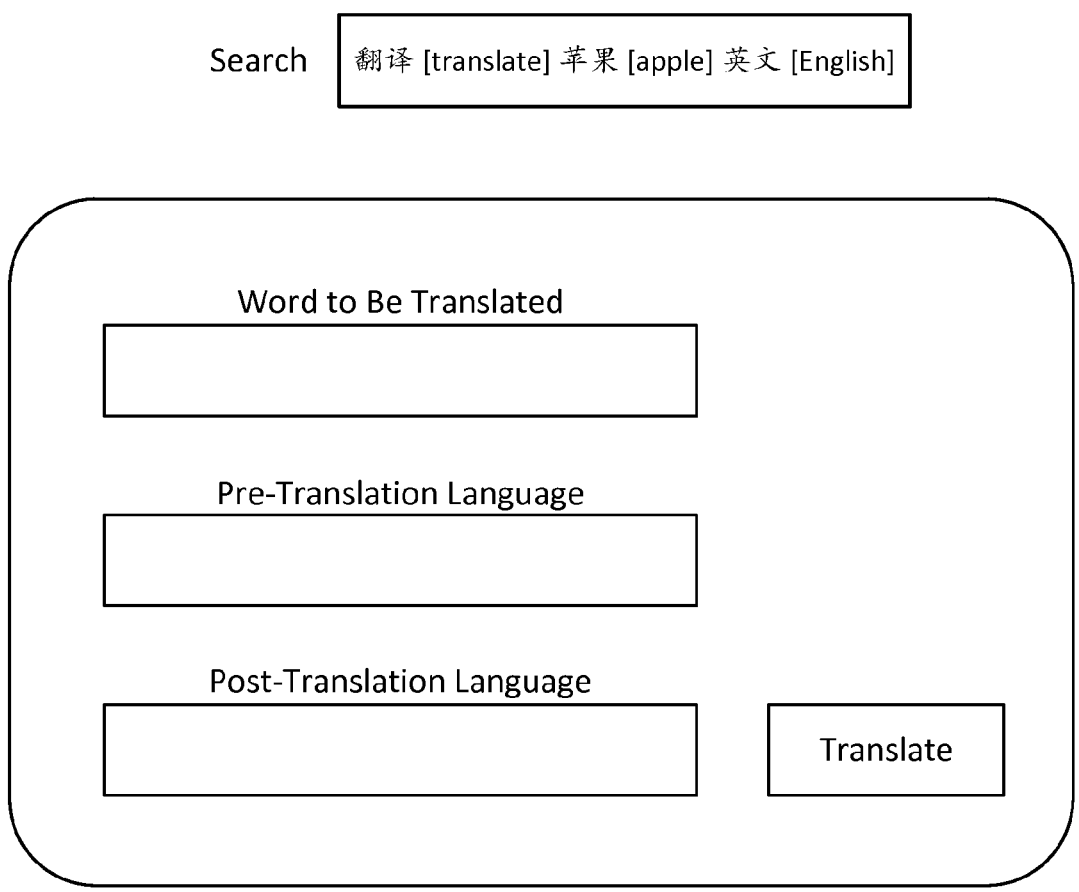
FIG. 9 is a diagram showing an example of an application interface of a translation application without values being prepopulated into any of the input fields.

FIG. 9 is a diagram showing an example of an application interface of a translation application without values being prepopulated into any of the input fields. The application interface includes three input fields corresponding to the respective name attributes of "Word to Be Translated," "Pre-Translation Language," and "Post-Translation Language." The search query input by the user is "翻译 [translate] 苹果 [apple] 英文 [English]." The determined keyword units are "翻译 [translate]," "苹果 [apple]," and "英文 [English]." The keyword unit "translate" is found to match a stored keyword unit corresponding to the translation application. It is determined that the attribute associated with the keyword unit of "苹果 [apple]" for this application corresponds to the attribute with the name of "Word to Be Translated" in this application interface and that the attribute associated with the keyword unit of "英文 [English]" for this application interface corresponds to the attribute with the name of "Post-Translation Language." Therefore, "苹果 [apple]" is used as the value to be entered into the input field associated with the attribute with the name of "Word to Be Translated," and "英文 [English]" is used as the value to be entered into the input field associated with the attribute with the name of "Post-Translation Language." Moreover, the word that is to be translated, "苹果 [apple]," is determined to match the pre-translation language of Chinese. Therefore, "中文 [Chinese]" is used as the value to be entered into the input field associated with the attribute with the name of "Pre-Translation Language."

Figure 10:
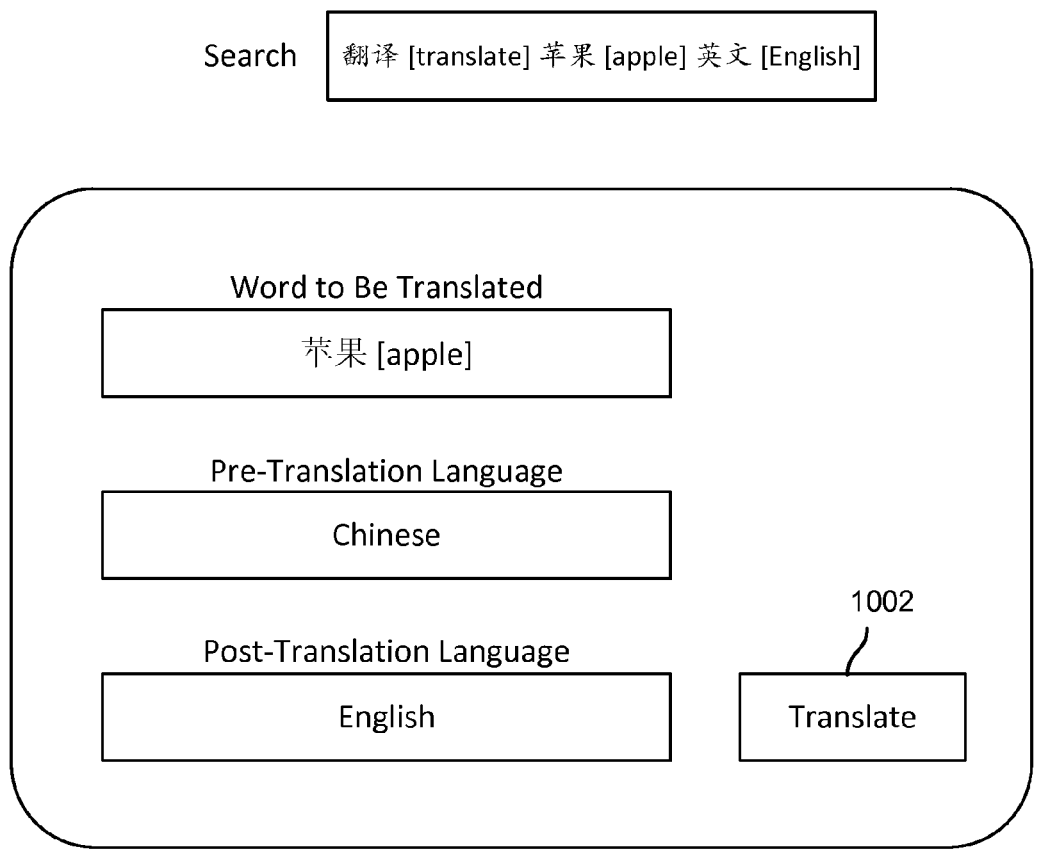
FIG. 10 is a diagram showing an application interface of a translation application with values having been prepopulated into the input fields.

FIG. 10 is a diagram showing an application interface of a translation application with values having been prepopulated into the input fields. In the example, the application interface of a translation application is the application interface that is described in FIG. 9 with the addition of the values described above being prepopulated into the appropriate input fields. The application interface with the prepopulated input fields may be presented to a user at a search results page in response to the user's search query for "翻译 [translate] 苹果 [apple] 英文 [English]." The user may cause the translation application to process the entered values in the event that the user selects translate button 1002. In some embodiments, in addition to presenting the application interface with the prepopulated values, processing results by the application based on the prepopulated values may be presented as well. In this example, the processing results may include the English word "apple."

Figure 11:
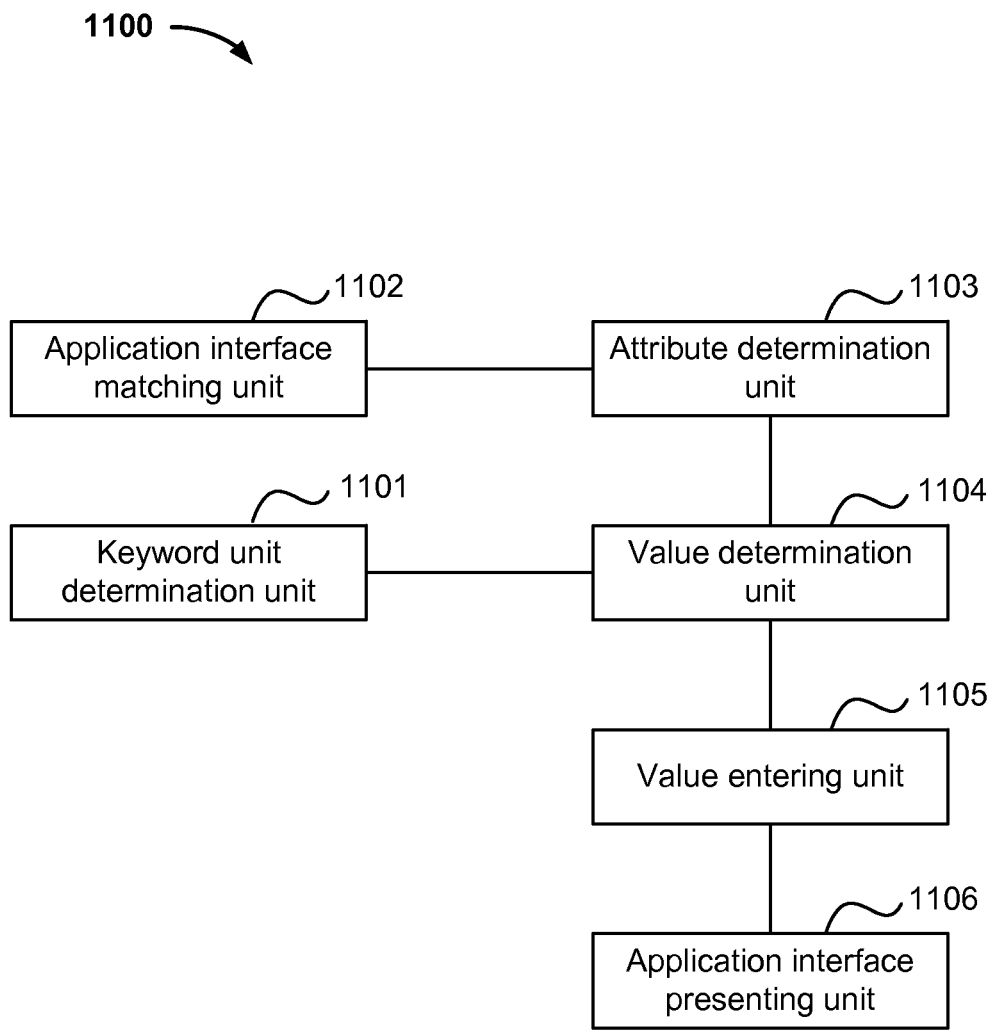
FIG. 11 is a diagram showing an embodiment of a system for completing application interfaces.

FIG. 11 is a diagram showing an embodiment of a system for completing application interfaces. In the example, system 1100 includes keyword unit determination unit 1101, application interface matching unit 1102, attribute determination unit 1103, value determination unit 1104, value entering unit 1105, and application interface presenting unit 1106.

The units and sub-units can be implemented as software components executing on one or more processors, as hardware such as programmable logic devices and/or Application Specific Integrated Circuits designed to be elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units and sub-units may be implemented on a single device or distributed across multiple devices.

Keyword unit determination unit 1101 is configured to segment a search query into one or more keyword units.

Application interface matching unit 1102 is configured to compare each of the keyword units determined by the keyword unit determination unit 1101 against the stored keyword units corresponding to each application interface stored in a predetermined application interface library.

Attribute determination unit 1103 is configured to determine the attribute associated with each input field included in the application interface determined by application interface matching unit 1102.

Value determination unit 1104 is configured to determine values corresponding to the input fields of the application interface determined by application interface matching unit 1102 based on the keyword units determined by the keyword unit determination unit 1101.

Value entering unit 1105 is configured to enter the values determined by value determination unit 1104 into corresponding input fields included in the application interface determined by application interface matching unit 1102.

Application interface presenting unit 1106 is configured to present the application interface with at least some of the input fields prepopulated with values for the user.

In some embodiments, application interface matching unit 1102 further includes:

A keyword unit selecting sub-unit that is configured to select, based on a preset keyword unit matching sequence, a first keyword unit from the keyword units determined by keyword unit determination unit 1101 and to select the next keyword unit based on the keyword unit matching sequence if the application interface matching sub-unit fails to match the first keyword unit against a stored keyword unit in the predetermined application interface library.

An application interface matching sub-unit that is configured to compare the keyword units selected by the keyword unit selecting sub-unit against each stored keyword unit corresponding to each application interface stored in the predetermined application interface library. If a match is successful, then the matching process ends.

In some embodiments, the application interface matching sub-unit that is configured to look up in the matching entry of the predetermined application interface the application interface index corresponding to the keyword unit determined to match the keyword unit selected by the keyword unit selecting sub-unit. If the corresponding application interface index is successfully looked up, then the application interface index is used to retrieve data associated with the corresponding application interface.

In some embodiments, the application interface matching sub-unit that is configured to determine the keyword category to which a keyword unit selected by the keyword unit selecting sub-unit belongs and compare it to each stored keyword unit category corresponding to each application interface stored in the predetermined application interface library. In some embodiments, the application interface matching sub-unit is configured to look up in the matching entry of the predetermined application interface library the application interface index corresponding to the stored keyword unit category determined to match the keyword unit category. If the corresponding application interface index is successfully looked up, then the application interface index is used to retrieve data associated with the corresponding application interface.

In some embodiments, attribute value determination unit 1104 includes:

An attribute determination sub-unit that is configured to determine the attribute associated with each keyword unit determined by keyword unit determination unit 1101 for the application interface determined by application interface matching unit 1102.

A keyword unit looking up sub-unit that is configured to determine a keyword unit by the keyword unit determination unit 1101, if any, that is associated with the attribute of each input field included in the application interface determined by application interface matching unit 1102.

An attribute value confirming sub-unit that is configured to determine the keyword unit determined by the keyword unit looking up sub-unit as the value associated with the attribute associated with the input field.

In some embodiments, the attribute determination sub-unit is configured to obtain a set of keyword unit attribute determination rules corresponding to the application interface determined by application interface matching unit 1102 and to determine, based on the obtained set of keyword unit attribute determination rules, the attribute associated with each keyword unit determined by the keyword unit determination unit 1101 for the determined application interface.

In some embodiments, system 1100 further includes:

A value entering unit that is configured to, prior to application interface presenting unit 1106 presenting the application interface with at least some of its input fields prepopulated with values to the user, perform the following: if the value corresponding to the attribute of each input field included in the application interface determined by application interface matching unit 1102 was not determined by value determination unit 1104 based on a keyword determined by the keyword unit determination unit 1101, determining that a predetermined value is to be entered into the input field.

In some embodiments, system 1100 further includes:

A processing unit that is configured to, prior to application interface presenting unit 1106 presenting the application interface with at least some of its input fields prepopulated with values to the user, perform the following: perform appropriate application processing based on the values entered into the input fields of the application interface to obtain processing results.

Application interface presenting unit 1106 is configured to present the application interface with at least some of its input fields prepopulated with values to the user and in some embodiments, also the processing result based on the prepopulated values.

In some embodiments, application interface presenting unit 1106 is configured to include:

A location inserting sub-unit that is configured to place the application interface with at least some of its input fields prepopulated with values at a location on the search results page that is to be presented to the user.

An application providing sub-unit that is configured to provide to the user the search results page with the presented application interface.

The system 1100 may be installed in a mobile terminal or in another terminal such as a personal computer (PC).

A person skilled in the art should understand that the embodiments of the present application can be provided as methods, devices (equipment), or computer software products. Therefore, the present application can take the form of embodiments comprising entirely of hardware, embodiments comprising entirely of software, and embodiments which combine software and hardware. In addition, the present application can take the form of computer program products implemented on one or more computer-operable storage media (including but not limited to magnetic disk storage devices, CD-ROMs, and optical storage devices) containing computer operable program codes.

The present application is described with reference to flow charts and/or block diagrams based on methods, devices (equipment) and computer program products in the embodiments of the present application. It should be understood that each process and/or block in the flow charts and/or block diagrams, and combinations of processes and/or blocks in the flow charts and/or block diagrams, can be achieved through computer program commands. One can provide these computer commands to a general-purpose computer, a specialized computer, an embedded processor, or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on computer-readable storage devices that can guide computers or other programmable data processing equipment to work in a particular way, with the result that the commands stored on these computer-readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although some embodiments of the present application have already been described, a person skilled in the art can make other modifications or revisions to these embodiments once he grasps the basic creative concept. Therefore, the attached claims are to be interpreted as including some of the embodiments here as well as all modifications and revisions falling within the scope of the present application. Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for completing an application interface, comprising:
   one or more processors configured to:
      segment a search query into one or more keyword units;
      determine the application interface based at least in part on the one or more keyword units, wherein to determine the application interface includes to:
         select at least one of the one or more keyword units based at least in part on a preset keyword matching sequence indicating an order in which the one or more keyword units are selected, wherein the preset keyword matching sequence is associated with positions in which the one or more keyword units appear in the search query; and
         determine that a predetermined application interface library comprises the application interface based at least in part on the selected at least one keyword unit, wherein the predetermined application interface library comprises mappings of keyword units or keyword categories corresponding to the keyword units to application interfaces;
      determine an attribute for an input field associated with the determined application interface based at least in part on a name or a format of a value to be entered into the input field;
      determine the value corresponding to the attribute based at least in part on the one or more keyword units, wherein to determine the value comprises to:
         determine that a keyword unit of the one or more keyword units is associated with the attribute for the input field based on a set of keyword unit attribute ascertaining rules associated with the determined application interface;
         determine the value to comprise the determined keyword unit; and
         prepopulate the input field with the value; and
      present the determined application interface, wherein the determined application interface includes the input field prepopulated with the value; and
   one or more memories coupled to the one or more processors configured to provide the one or more processors with instructions.

2. The system of claim 1, wherein to determine the application interface includes to:
   compare the selected at least one keyword unit against each of at least a subset of stored keyword units included in the predetermined application interface library;
   wherein in the event that a match is found between the selected at least one keyword unit and a stored keyword unit of the stored keyword units, determine that an application interface corresponding to the matched stored keyword unit is the determined application interface.

3. The system of claim 1, wherein to determine the application interface includes to:
   determine a keyword unit category based at least in part on the selected at least one keyword unit; and
   compare the determined keyword unit category against each of at least a subset of stored keyword unit categories included in the predetermined application interface library;
   wherein in the event that a match is found between the determined keyword unit category and a stored keyword unit category of the stored keyword unit categories, determine that an application interface corresponding to the matched stored keyword unit category is the determined application interface.

4. The system of claim 3, wherein to determine the keyword unit category based at least in part on the selected at least one keyword unit is based at least in part on predetermined ascertaining rules.

5. The system of claim 1, wherein to determine the attribute for the input field associated with the determined application interface is based at least in part on a first stored mapping between the determined application interface and the input field and a second stored mapping between the input field and the attribute.

6. The system of claim 1, wherein the determined application interface is presented at a search results page.

7. The system of claim 1, wherein the one or more processors are further configured to:
use an application associated with the application interface to process the value based at least in part on a function associated with the application; and
present processing results based at least in part on processing the value.

8. The system of claim 1, wherein the one or more processors are configured to receive a revised value that is input by a user and that is associated with the input field.

9. The system of claim 8, wherein the one or more processors are configured to:
use an application associated with the application interface to process the revised value based at least in part on a function associated with the application; and
present processing results based at least in part on processing the revised value.

10. A method for completing an application interface, comprising:
segmenting a search query into one or more keyword units;
determining the application interface based at least in part on the one or more keyword units, wherein determining the application interface includes:
selecting at least one of the one or more keyword units based at least in part on a preset keyword matching sequence indicating an order in which the one or more keyword units are selected, wherein the preset keyword matching sequence is associated with positions in which the one or more keyword units appear in the search query; and
determining that a predetermined application interface library comprises the application interface based at least in part on the selected at least one keyword unit, wherein the predetermined application interface library comprises mappings of keyword units or keyword categories corresponding to the keyword units to application interfaces;
determining an attribute for an input field associated with the determined application interface based at least in part on a name or a format of a value to be entered into the input field;
determining, using a processor, the value corresponding to the attribute based at least in part on the one or more keyword units, wherein determining the value comprises:
determining that a keyword unit of the one or more keyword units is associated with the attribute for the input field based on a set of keyword unit attribute ascertaining rules associated with the determined application interface;
determining the value to comprise the determined keyword unit; and
prepopulating the input field with the value; and
presenting the determined application interface, wherein the determined application interface includes the input field prepopulated with the value.

11. The method of claim 10, wherein determining the application interface includes:

comparing the selected at least one keyword unit against each of at least a subset of stored keyword units included in the predetermined application interface library;
wherein in the event that a match is found between the selected at least one keyword unit and a stored keyword unit of the stored keyword units, determining that an application interface corresponding to the matched stored keyword unit is the determined application interface.

12. The method of claim 10, wherein determining the application interface includes:
determining a keyword unit category based at least in part on the selected at least one keyword unit; and
comparing the determined keyword unit category against each of at least a subset of stored keyword unit categories included in the predetermined application interface library;
wherein in the event that a match is found between the determined keyword unit category and a stored keyword unit category of the stored keyword unit categories, determining that an application interface corresponding to the matched stored keyword unit category is the determined application interface.

13. The method of claim 10, further comprising:
using an application associated with the application interface to process the value based at least in part on a function associated with the application; and
presenting processing results based at least in part on processing the value.

14. The method of claim 10, further comprising receiving a revised value that is input by a user and that is associated with the input field.

15. The method of claim 14, further comprising:
using an application associated with the application interface to process the revised value based at least in part on a function associated with the application; and
presenting processing results based at least in part on processing the revised value.

16. A computer program product for completing an application interface, the computer program product being embodied in a non-transitory computer readable storage medium and comprising computer instructions for:
segmenting a search query into one or more keyword units;
determining the application interface based at least in part on the one or more keyword units, wherein determining the application interface includes:
selecting at least one of the one or more keyword units based at least in part on a preset keyword matching sequence indicating an order in which the one or more keyword units are selected, wherein the preset keyword matching sequence is associated with positions in which the one or more keyword units appear in the search query; and
determining that a predetermined application interface library comprises the application interface based at least in part on the selected at least one keyword unit, wherein the predetermined application interface library comprises mappings of keyword units or keyword categories corresponding to the keyword units to application interfaces;
determining an attribute for an input field associated with the determined application interface based at least in part on a name or a format of a value to be entered into the input field;

determining the value corresponding to the attribute based at least in part on the one or more keyword units; and presenting the determined application interface, wherein the determined application interface includes the input field prepopulated with the value.

* * * * *

UNITED STATES PATENT AND TRADEMARK OFFICE
CERTIFICATE OF CORRECTION

PATENT NO. : 9,710,572 B2
APPLICATION NO. : 13/899219
DATED : July 18, 2017
INVENTOR(S) : Zhiyu Zhu Page 1 of 1

It is certified that error appears in the above-identified patent and that said Letters Patent is hereby corrected as shown below:

On the Title Page

Item (56), Foreign Patent Documents, Page 2, Column 2, Japanese Publication number delete "20053095666 A" and insert --2005309666 A--, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*